(12) United States Patent
Mneimneh et al.

(10) Patent No.: US 8,073,727 B2
(45) Date of Patent: Dec. 6, 2011

(54) SYSTEM AND METHOD FOR HIERARCHICAL WEIGHTING OF MODEL PARAMETERS

(75) Inventors: Mohamed Mneimneh, Scottsdale, AZ (US); Yetkin Ileri, Scottsdale, AZ (US); Brent May, Scottsdale, AZ (US)

(73) Assignee: SAP AG, Walldorf (DE)

( * ) Notice: Subject to any disclaimer, the term of this patent is extended or adjusted under 35 U.S.C. 154(b) by 676 days.

(21) Appl. No.: 12/256,849

(22) Filed: Oct. 23, 2008

(65) Prior Publication Data

US 2010/0106555 A1      Apr. 29, 2010

(51) Int. Cl.
*G06F 17/30* (2006.01)
(52) U.S. Cl. ..................................... 705/7.31
(58) Field of Classification Search ................ 705/7.31
See application file for complete search history.

(56) References Cited

U.S. PATENT DOCUMENTS

| | | | |
|---|---|---|---|
| 6,308,162 B1 * | 10/2001 | Ouimet et al. ............... | 705/7.36 |
| 7,603,286 B2 * | 10/2009 | Ouimet ......................... | 705/7.31 |
| 7,739,166 B2 * | 6/2010 | Mathews et al. ............. | 705/35 |

OTHER PUBLICATIONS

Tech-Hua et al (Managing Demand and Sales Dynamics in New Product Diffusion Under Supply Constraints), Feb. 2002, Management Sciiences, vol. 48, pp. 187-206.*

* cited by examiner

*Primary Examiner* — Romain Jeanty
(74) *Attorney, Agent, or Firm* — Buckley, Maschoff & Talwalkar LLC (57) ABSTRACT

A computer-implemented method estimates model parameters for a product. The method includes storing transaction data from customer sales in a database. The transaction data includes a product and a store. The database includes a hierarchical categorization of the products or the stores. The method includes generating a model for each product at each store in the database. The models include model parameters. The method includes aggregating first and second sets of model parameters from a first set of products occupying a first node of the hierarchical categorization and a second set of products occupying a second node of the hierarchical categorization, weighting the first and second sets of model parameters, and storing the average of the weighted first and second sets of model parameters in the database as the model parameters for a model of a product.

20 Claims, 6 Drawing Sheets

SYSTEM AND METHOD FOR HIERARCHICAL WEIGHTING OF MODEL PARAMETERS

FIELD OF THE INVENTION

The present invention relates in general to economic modeling and, more particularly, to a system and method for hierarchical weighting of model parameters.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task is to generate a mathematical model of the system which predicts how the system will behave with different sets of data and assumptions.

In its basic form, the economic model can be viewed as a predicted or anticipated outcome of a mathematical expression, as driven by a given set of input data and assumptions. The input data are processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited customers and business. Most if not all retail stores expend great effort to maximize sales, volume, revenue, and/or profit. Economic modeling can be a very effective tool in helping the store owners and managers achieve these goals.

Economic modeling typically requires large amounts of data. In the retail environment, the data is collected at the completion of the transaction, usually during the check-out process. The transactional log (T-LOG) data contains information about the items purchased, time and date of purchase, store, price, promotions, customer attributes, and so on. The T-LOG data is stored in a database for use by the retailer in generating and using the models.

To prepare a model of sales or demand of any particular product at a particular store, the T-LOG data is first aggregated over one or more variable. The aggregated T-LOG data is analyzed and a series of parameters are generated that define the demand model for that particular product-store combination. For products that have a relatively high sales volume, the T-LOG data contains many data points and the demand model for that product is relatively robust. For products with few data points, however, the model parameters may be based upon too little data and the resulting model parameters can be relatively inaccurate due to statistical noise in the T-LOG data. Accordingly, for new or recently introduced products with few T-LOG data entries, it is difficult to prepare robust model parameters. Furthermore, depending upon the sales volume of the product, it may take weeks or months before the T-LOG data contains sufficient information to generate robust model parameters for the recently introduced product.

SUMMARY OF THE INVENTION

In one embodiment, the present invention is a computer-implemented method of estimating demand model parameters comprising storing transaction data from customer sales in a database. The transaction data includes a product and a store. The database includes a hierarchical categorization of the products or the stores. The method includes generating a demand model for each product at each store in the database. The demand models include model parameters. The method includes aggregating first and second sets of model parameters from a first set of products occupying a first node of the hierarchical categorization and a second set of products occupying a second node of the hierarchical categorization. The method includes weighting the first and second sets of model parameters, and storing the average of the weighted first and second sets of model parameters in the database as the model parameters for a demand model of a new product.

In another embodiment, the present invention is a computer-implemented method of estimating model parameters comprising storing transaction data from customer sales in a database. The transaction data includes a product and a store. The method includes generating a model for each product. The models include model parameters. The method includes aggregating first and second sets of model parameters from a first set of products occupying a first node of a hierarchical categorization and a second set of products occupying a second node of the hierarchical categorization, and storing a combination of the first and second sets of model parameters in the database.

In another embodiment, the present invention is a computer program product usable with a programmable computer processor having a computer readable program code embodied therein comprising computer readable program code which stores transaction data from customer sales in a database. The transaction data includes a product and a store. The computer program product includes computer readable program code which generates a model for each product. The models include model parameters. The computer program product includes computer readable program code which aggregates first and second sets of model parameters from a first set of products occupying a first node of a hierarchical categorization and a second set of products occupying a second node of the hierarchical categorization, and computer readable program code which stores a combination of the first and second sets of model parameters in the database.

In another embodiment, the present invention is a computer system for manipulating data comprising means for storing transaction data from customer sales in a database. The transaction data includes a product and a store. The computer system includes means for generating a model for each product. The models include model parameters. The computer system includes means for aggregating first and second sets of model parameters from a first set of products occupying a first node of a hierarchical categorization and a second set of products occupying a second node of the hierarchical categorization, and means for storing a combination of the first and second sets of model parameters in the database.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses such as manufacturing, distribution, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general customer merchandise and other retail outlets. Many businesses are interested in economic modeling and forecasting, particularly when the model provides a high degree of accuracy or confidence. Such information is a powerful tool and highly valuable to the business.

Using the present system, a retailer collects sales transaction log (T-LOG) data for various products. Using the T-LOG data, the system generates a prediction model for each product at each store. The prediction model is based upon the T-LOG data for that product and includes a plurality of parameters. The values of the parameters define the demand model and may be used for making predictions about the future sales activity for that product. For example, the model for each product can predict future demand or sales of the product at that store in response to changes in the product's price, associated promotions or advertising, as well as impacts from holidays and local seasonal variations.

When introducing a new product, however, the retailer has little or no available T-LOG data upon which to build a demand model for the new product. Using the present system, however, parameters that have already been generated for other, similar products sold in similar markets are weighted and combined together to provide preliminary parameter data to be used in a model for sales or demand predictions of the new product.

Figure 1:
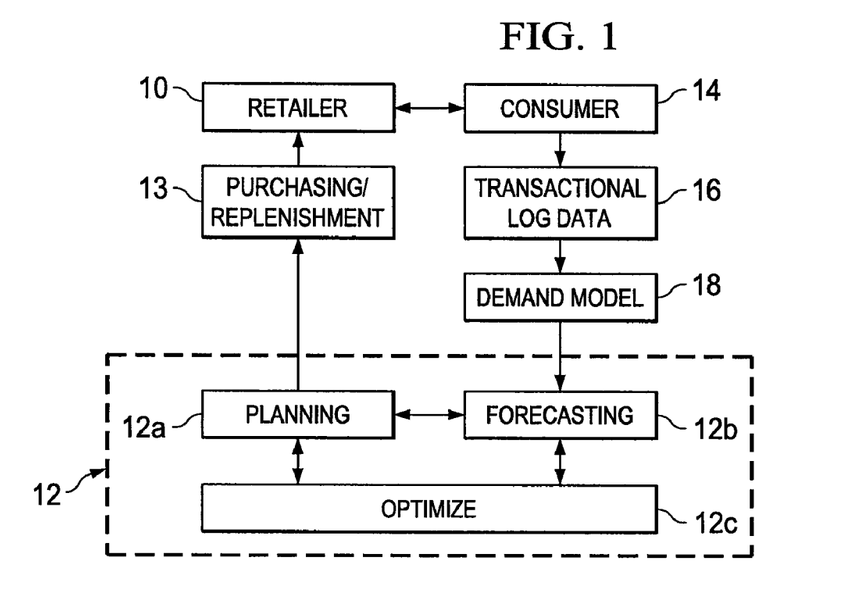
FIG. 1 is a block diagram of a system for analyzing transaction log data to generate demand models and executing a business plan in accordance with those demand models.

Referring to FIG. 1, retailer 10 has certain product lines or services available to customers as part of its business plan 12. The terms products and services are interchangeable in the present application. Retailer 10 may be a food store chain, general customer product retailer, drug store, discount warehouse, department store, specialty store, or service provider. Retailer 10 has the ability to set pricing, order inventory, run promotions, arrange its product displays, collect and maintain historical sales data, and adjust its strategic business plan. While the present discussion will center around retailer 10, it is understood that the system described herein is applicable to data analysis in other industries and businesses having similar goals, constraints, and needs.

Business plan 12 includes many planning 12a, forecasting 12b, and optimization 12c steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make operational decisions. With input from the planning 12a, forecasting, 12b and optimization 12c steps and operations of business plan 12, retailer 10 undertakes various purchasing or replenishment operations 13. Retailer 10 can change business plan 12 as needed.

Retailer 10 routinely enters into sales transactions with customers 14. In fact, retailer 10 maintains and updates its business plan 12 to increase the number of transactions (and thus revenue and/or profit) between retailer 10 and customer 14. Customer 14 can be a specific individual, account, or business entity.

For each sales transaction entered into between retailer 10 and customer 14, information describing the transaction is stored in T-LOG 16. When a customer goes through the cash register at a grocery or any other retail store, each of the items to be purchased is scanned and data is collected and stored by a point-of-sale system, or other suitable data storage system, in T-LOG 16. The data includes the then current price, promotion and merchandising information associated with the product along with the units purchased, and the dollar sales. The date and time, and store and customer information corresponding to that purchase are also recorded.

T-LOG 16 contains one or more line items for each retail transaction, such as those shown in Table 1. Each line item includes information relating to the transaction such as store number, product number, time of transaction, transaction number, quantity, current price, profit, promotion number, and customer or customer category number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, sale price, coupon, rebate, end-cap, etc.; customer identifies the customer by type, class, region, or individual, e.g., discount card holder, government sponsored or underprivileged, volume purchaser, corporate entity, preferred customer, or special member. T-LOG 16 is accurate, observable, and granular product information based on actual retail transactions within the store. T-LOG 16 represents the known and observable results from the customer buying decision or process. T-LOG 16 may contain thousands of transactions for retailer 10 per store per day, or millions of transactions per chain of stores per day.

TABLE 1

T-LOG Data

| Store | Product | Time | Trans | Qty | Price | Profit | Promotion | Customer |
|-------|---------|------|-------|-----|-------|--------|-----------|----------|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which customer C1 purchased one product P1 at $1.50. The next two line items also refer to transaction T1 and day/time D1, in which customer C1 also purchased two products P2 at $0.80 each and three products P3 at price $3.00 each. In transaction T2 on day/time D1, customer C2 has four products P4 at price $1.80 each and one product P5 at price $2.25. In transaction T3 on day/time D1, customer C3 has ten products P6 at $2.65 each, in his or her basket. In transaction T1 on day/time D2 (different day and time) in store S1, customer C4 purchased five products P1 at price $1.50 each. In store S2, transaction T1 with customer C5 on day/time D3 (different day and time) involved one product P7 at price $5.00. In store S2, transaction T2 with customer C6 on day/time D3 involved two products P1 at price $1.50 each and one product P8 at price $3.30.

Table 1 further shows that product P1 in transaction T1 had promotion PROMO1. PROMO0 may be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a 0.50 rebate. Product P8 in transaction T2 had no promotional offering. A promotion may also be classified as a combination of promotions, e.g., flyer with sale price or end-cap with rebate.

Retailer 10 may also provide additional information to T-LOG 16 such as promotional calendar and events, store set-up, shelf location, end-cap displays, flyers, and advertisements. The information associated with a flyer distribution, e.g., publication medium, run dates, distribution, product location within flyer, and advertised prices, is stored within T-LOG 16.

With T-LOG 16 data collected, any suitable method or algorithm may be used to analyze the data and form model 18. The model 18 may use a combination of linear, nonlinear, deterministic, stochastic, static, or dynamic equations or models for analyzing T-LOG 16 or aggregated T-LOG 16 data and making predictions about future transactions for a particular product at a particular store. Model 18 is defined by a plurality of parameters and may be used to generate unit sales forecasting, price optimization, promotion optimization, markdown/clearance optimization, assortment optimization, merchandize and assortment planning, and replenishment optimization. Model 18 has a suitable output and reporting system that enables the output from model 18 to be retrieved and analyzed for updating business plan 12.

After collection and analysis of the T-LOG data, several models are generated for each product sold by retailer 10 at each store. The models are defined by several parameters that provide weighting for different elements of the models. For example, the parameters control how the model reflects changes in product advertising, pricing, promotional activities or other aspects of the market environment for the product. Table 2 shows an example database table containing the model parameters for models of several products sold at particular stores.

TABLE 2

Model Data

| Product | Store | $\rho 1$ | $\rho 2$ | $\rho 3$ | $\rho 4$ | $\rho 5$ | $\rho 6$ | $\rho 7$ | ... | $\rho n$ |
|---------|-------|----|------|---|-----|-----|-----|---|-----|----|
| P1 | S1 | 1 | 2 | 1 | — | 0 | — | — | | x |
| P1 | S2 | 1 | 1.75 | 2 | — | — | — | — | | x |
| P2 | S1 | 1 | 5 | 7 | 2 | 1.1 | 0 | — | | x |
| P3 | S2 | 1 | 5 | 2 | 1.1 | 3 | 1.7 | 3 | | x |

As shown in Table 2, a series of model parameters ($\rho 1$-$\rho n$) are defined for each product at each store. Each parameter describes how changes to the product's marketing, pricing or promotion environment affects sales of the product. For example, one parameter may indicate the degree of price elasticity associated with the product, while a second parameter describes the promotional lift of the product—the degree to which a particular promotion affects sales of the product. Depending upon the T-LOG data, each product model may include values for all available model parameters or only a subset of the available parameters. For example, if there are no promotions associated with a particular product, then the model for that product will not include the parameters that relate to promotions. With the model parameters defined for each product, retailer 10 can predict the market response to various changes in the pricing structure, or promotional activities relating to the product.

Unfortunately, for new or recently introduced products, or products having a small sales volume, only a minimal amount of T-LOG data is available. With little T-LOG data, any models generated for the new products are likely to be inaccurate as the statistical noise in the T-LOG data will be substantial and cause inaccuracies. With more T-LOG data, however, the models would provide better performance and improved accuracy.

In some cases, additional sales data for the new product may be retrieved from external data sources. Obtaining prior information from external sources, however, can be costly, time-consuming, and impractical. Instead, valuable prior information may be obtained from the other, previously evaluated models for other products sold by retailer 10. By reviewing the model data for other similar products, a preliminary set of estimated model parameters can be generated for the new product.

Retailer 10 may sell thousands of different products in many different locations or stores, each having different sales characteristics. Accordingly, it is important to use model parameters for similar products sold in similar commercial environments when estimating the model parameters for the new product. If the other products are too different or the sales environment dissimilar, their model parameters may be irrelevant to the new product. For example, if a new soda is introduced by a retailer 10, it would not make sense to rely on model parameters for sales of entertainment centers when estimating the preliminary model parameters for the new soda. Similarly, it would not make sense to estimate parameters for sales of winter clothing in Phoenix based upon sales of the same clothing in Detroit. Instead, the system should use model parameters from similar products, such as other beverages, sold at similar stores, such as at stores in Phoenix, to provide the initial parameters for use in a model for the new product.

When relying on data from other products or stores to generate initial parameter values, however, the number of other identical or very similar products or stores may be insufficient to generate robust parameters. Accordingly, it may be necessary to combine model parameters from several categories of products and stores, some more similar to the new product than others. As the product types or stores start to differ, however, the relative weight of their model parameter values should be reduced accordingly. For example, when generating parameters for a new soda product, the system may use the parameters from pre-existing models of other sodas, fruit juices, and alcoholic beverages. When combining the model parameters from each group of products, the parameter values for alcoholic beverages should not be given as much weight as the parameter values from the models for other sodas.

The present system uses a hierarchical categorization of products and stores to determine which pre-existing product models can be mined to accurately estimate model parameter values for new, low volume, or recently introduced products. Depending upon customer needs, the hierarchical structure of products and stores may use any attribute of the products or stores to configure the hierarchical structure—it is only important that products or stores in the same node of the hierarchy share at least one attribute. For example, with reference to FIG. 2, a particular product hierarchy (from less inclusive to more inclusive) could be: 'BrandX Cola'-'Colas'-'Soft Drinks'-'Beverages'-'Grocery'. Similarly, with reference to FIG. 3, a particular store hierarchy could be: 'Store A'-'Scottsdale'-'Phoenix Metro Area'-'Arizona'-'Southwest'-'United States'. Generally, the degree of similarity between the products or stores decreases with each step upwards through the hierarchy. Because the degree of similarity decreases, each step up the hierarchy moves to a more inclusive node that contains more products and, consequently, a greater volume of T-LOG data.

Figure 4:
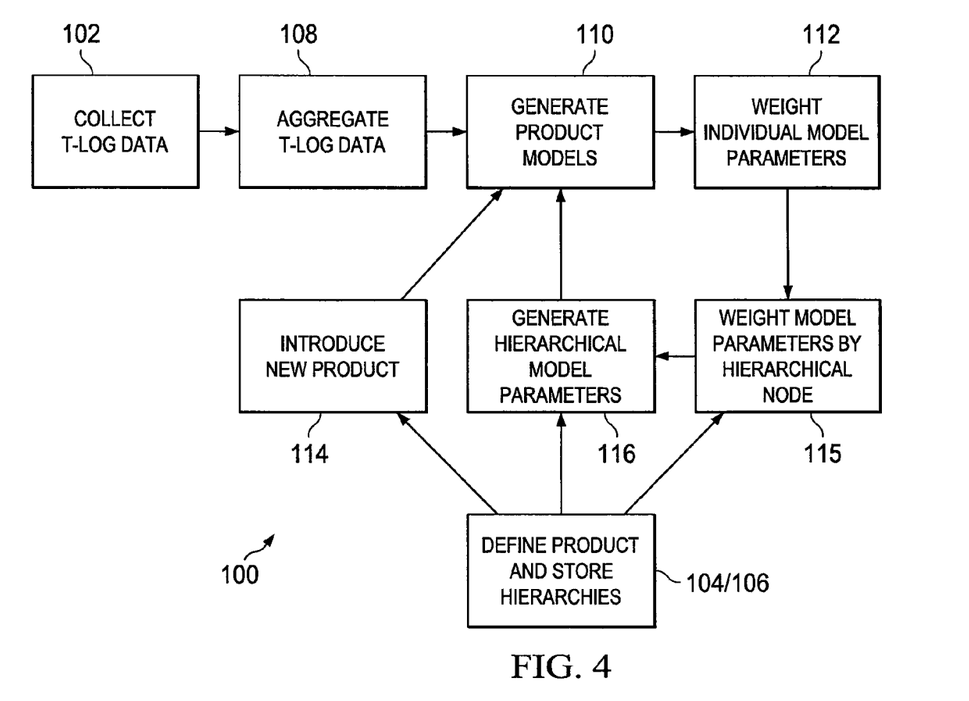
FIG. 4 is a process of generating estimated model parameters for a new product based upon pre-existing model parameter values.

FIG. 4 illustrates example method 100 for determining estimated model parameter values for a new or recently introduced product, or a product having low sales volume using prior model parameters from other, similar products and/or product-store combinations. In the present example, a new product is introduced to a single store of retailer 10. In other situations, the system may be used to develop estimated parameter values for pre-existing products offered at a new store, or a product that has been previously offered at other stores. In the method of FIG. 4, the three initial steps of collecting T-LOG data 102, defining product and store hierarchies 104/106 may be performed in any order. For example, the hierarchies may be defined some time after the T-LOG data is collected, or vice versa.

The step of collecting T-log data 102 includes recording data associated with the many transactions for products entered into between retailer 10 and consumers 14. The T-LOG data records several data points associated with the transaction including product, store, price, quantity, profit and associated promotions. Because the volume of transactions may be substantial, the data is optionally aggregated over one or more variables in step 108 before analysis. For example, the data may be aggregated by store, hour of sale, and promotion. By aggregating the T-LOG data over one or more dimensions, the volume of data is reduced making data manipulation easier and more efficient.

After optional T-LOG data aggregation in step 108, the aggregated T-LOG data is analyzed and a plurality of model parameters are generated for each product at a particular store in step 110. The model parameters allow for predictions of future sales of each product sold at a particular store by retailer 10. The system may use a combination of linear, nonlinear, deterministic, stochastic, static, or dynamic equations or models for analyzing the raw T-LOG data or the aggregated T-LOG data and making predictions about future transactions. Each product model is characterized by a plurality of parameters that determine how the model responds to particular inputs. The parameters, for example, control how the model for sales of a particular product at a particular store will change as a result of price changes, promotion changes, or additional advertising for the product.

After determining the raw model parameters for each product sold by retailer 10, the system optionally applies a weighting to each product's model parameters to fine-tune the parameter values in step 112. Each of the model parameters is weighted based on any attribute of the product, the T-LOG data associated with the product or other similar products, or the model itself, including the quality of the model fit for any particular parameter, model confidence level, the statistical variance of the model, the number of parameter observations encompassed by a hierarchy node containing the product, and the hierarchy level number containing the product. By weighting the individual product model parameters, the inclusion of "good" parameter observations for very similar products are weighted highest while "less good" parameter observations for dissimilar products are weighted less. Accordingly, only well-measured parameters or parameter values that have high confidence are used in the sample average at each node in order to reduce their contribution to the final estimated parameter value. For example, retailer 10 may sell several different sodas. Within the sodas node of the product hierarchy, the system assigns different weights to the model parameters of each individual soda product. If one type of soda has not met a minimum threshold number of sales when compared to the other products, for example, the model parameters for that product may be discarded entirely or assigned a weighting of zero because they are based upon insufficient data. The model parameters of another soda product may show significant statistical variance, in which case the system may assign those model parameters a lower weight to minimize their effect on any parameter estimates. The weighting may be performed on all model parameters for all products sold at all stores of retailer 10. In another embodiment, this weighting procedure may be performed after a plurality of model parameters are aggregated at a particular hierarchical node. For example, if the total number of transactions at a particular node do not meet some minimum threshold, the parameter values for that node may be discarded and the system moves onto the next higher node, which includes more transaction entries.

Having generated weighted model parameters for each individual product at each store, retailer 10 also prepares product and store hierarchies in steps 104 and 106 to categorize the many products sold by retailer 10 and the different stores of retailer 10. The hierarchical structures allow the present system to determine which products or product/store combinations are most closely related to the new product introduced by retailer 10. Using the model parameters of closely related pre-existing products, the system can make accurate estimates of the model parameters for the new product.

Figure 2:
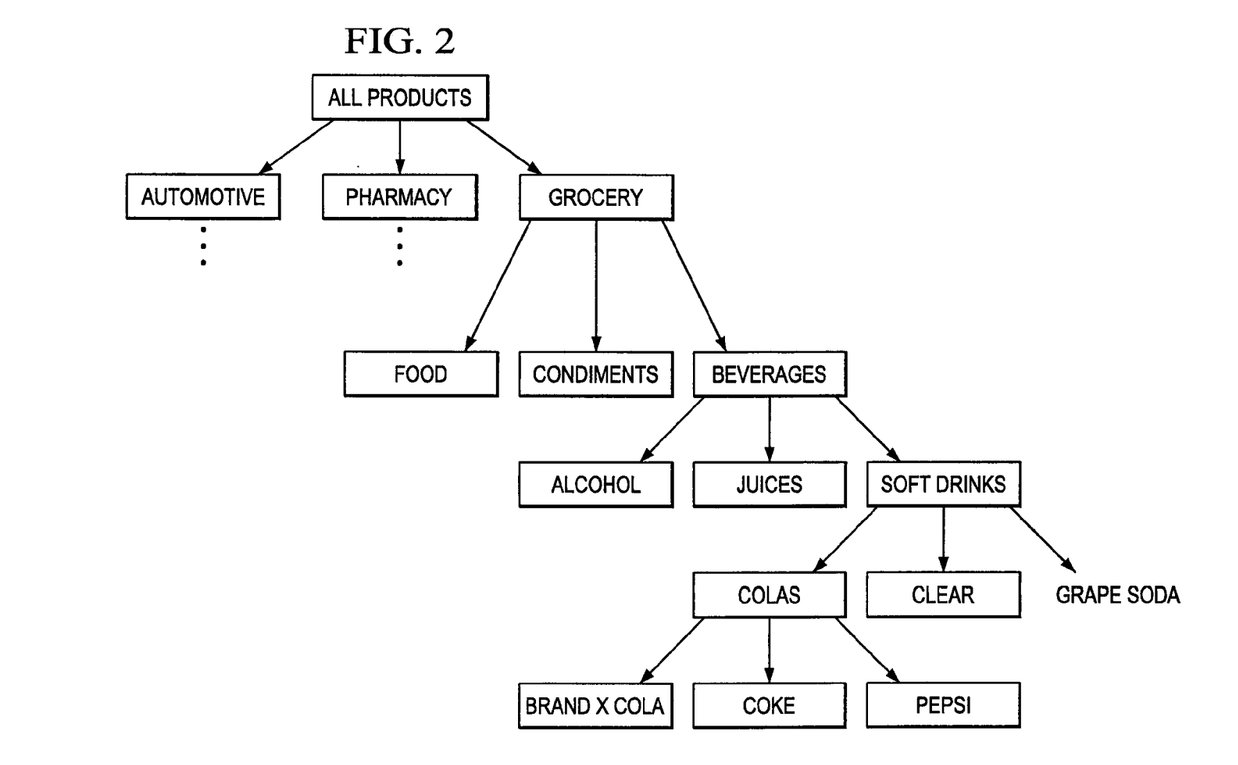
FIG. 2 is a block diagram illustrating a hierarchical categorization of a plurality of products offered for sale by a retailer.
Figure 3:
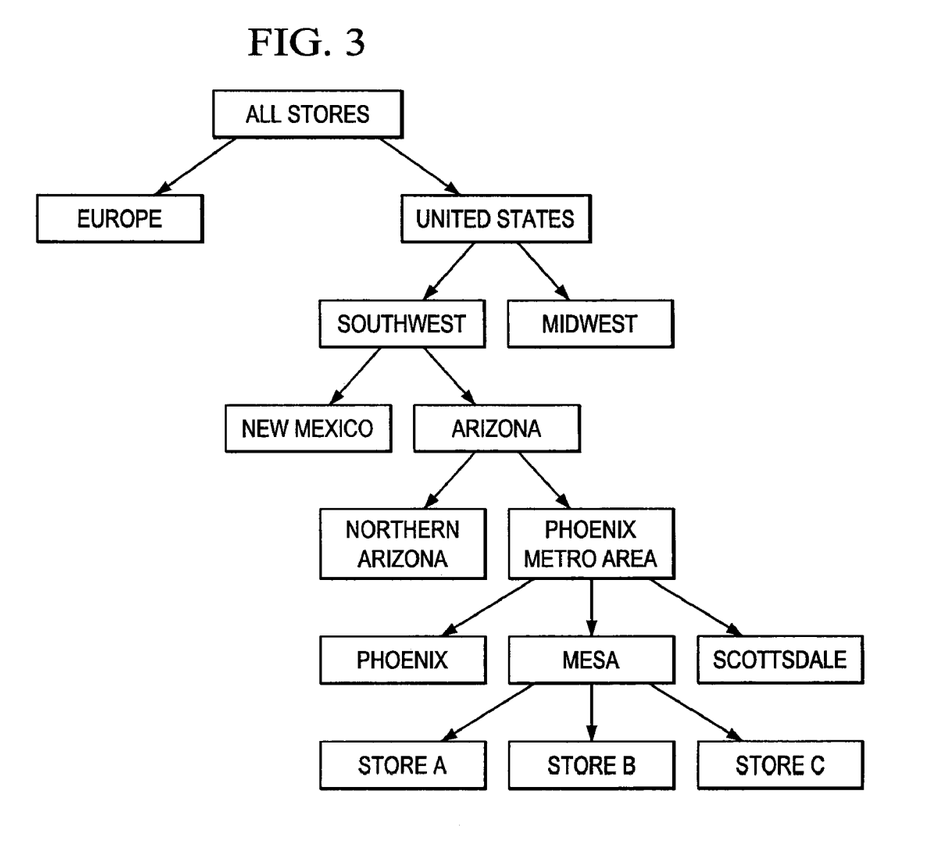
FIG. 3 is a block diagram illustrating a hierarchical categorization of a plurality of stores operated by a retailer.

Example hierarchical structures for products and stores are shown in FIGS. 2 and 3. In a hierarchical structure, any attribute of the products or stores may be used to build the hierarchical structure—it is only important that products or stores in the same node of the hierarchy share at least one attribute, characteristic, or feature. Moving down each hierarchy, the products or stores belonging to each node of the hierarchy become increasingly similar, share increasing numbers of product or store attributes, and are more substitutable for one another. Depending upon the system or business requirements, one or more hierarchical structure may be prepared. Example hierarchical structures include those based on product type, product brand, product attribute (e.g. size, shape, color, style, or feature), customer type, store type (e.g. brick-and-mortar, or online retailer), store attribute (e.g., size, or location) or competitor stores. After preparing the hierarchies, each product sold by retailer 10 is assigned to a node or nodes within each hierarchy.

Upon the introduction of a new product, retailer 10 assigns the new product to a node within both the product and store hierarchies in step 114. Depending upon retailer 10 requirements, the new product may be placed with other similar products at the very bottom of each hierarchical structure (i.e., in a node containing only specific products). In other embodiments, the new product may be placed in the middle of a hierarchy, into a node where is it grouped with categories of products rather than specific products. For example, FIG. 2 shows 'grape soda' in the 'soft drinks' node along with the groupings of 'colas' and 'clear' soft drinks.

Figure 6:
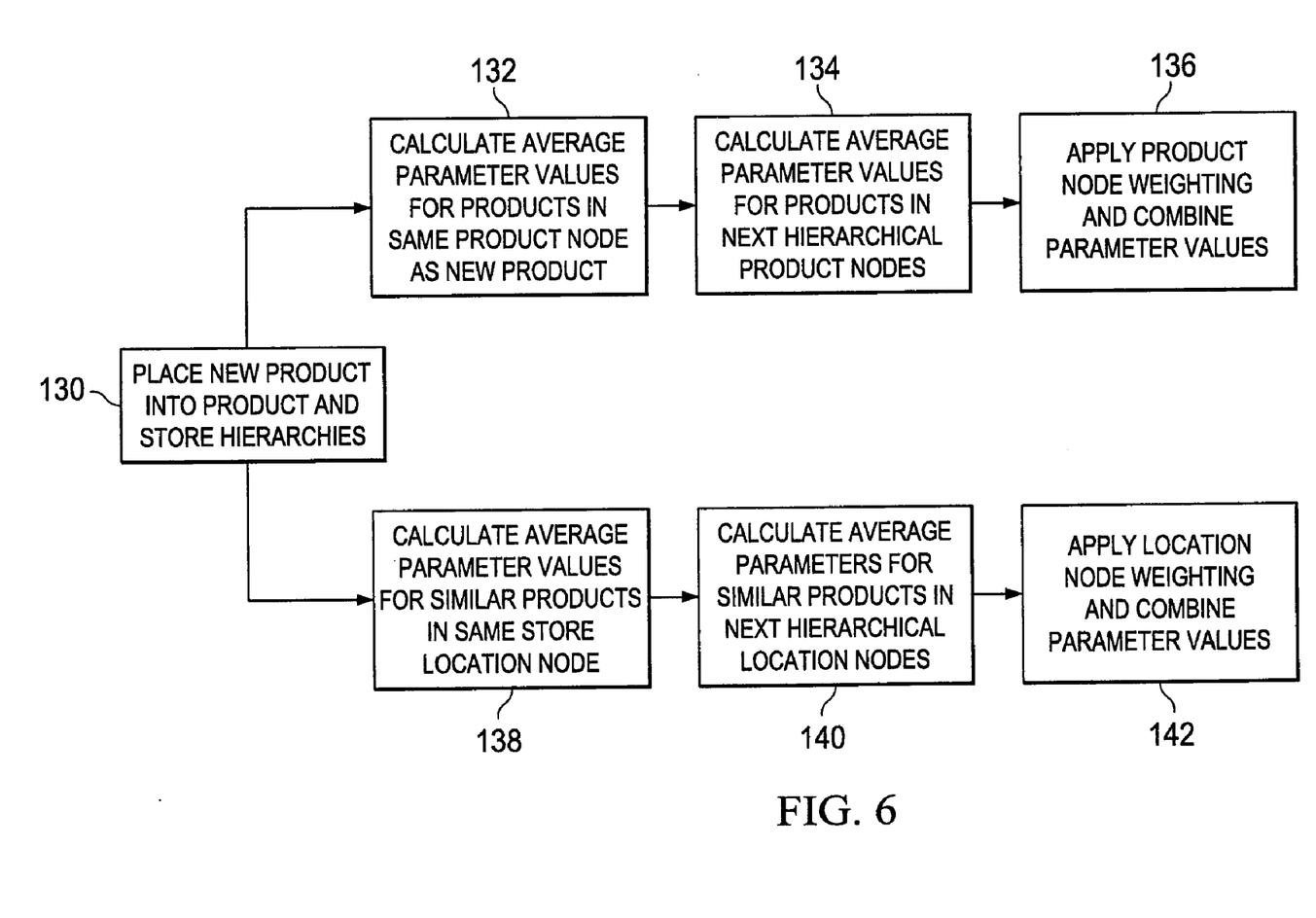
FIG. 6 illustrates additional detail of a method of generating estimated parameter values using both a product and store hierarchy.

With the product and store hierarchies, weighted model parameters for collections of product models are determined at a plurality of hierarchical nodes in step 115. Using the weighted model parameters of each hierarchical node, individual weighted parameters for existing product/store combinations, retailer 10 can use the present system to generate estimated model parameters for a product in step 116. FIG. 6 illustrates more detail of steps 114, 115 and 116 of FIG. 4. As shown in FIG. 4, the method of estimating model parameters may employ a feedback loop. For example, using the process, estimated model parameters for a recently introduced product may themselves be used to generated estimated model parameters for another, recently introduced product. As the volume of T-LOG data for each product increases, however, the values of the model parameters are increasingly controlled by the legitimate T-LOG data, while the effect of the estimated model parameters is reduced. Accordingly, as the volume of T-LOG data increases, the model parameters for each new or recently introduced product become increasingly accurate and rely less and less on the estimated parameter values.

In the following example, retailer 10 has introduced a new soda product, X-cola, into store-A in Scottsdale, Ariz. in step 130. The product is not sold at any other stores of retailer 10. Because the product is new, there is no T-LOG data associated with X-cola at store-A, or any other store. Retailer 10 uses the present system to estimate preliminary model parameters for the X-cola product to develop a strategy for pricing and advertising the product and to determine which promotions should be offered for X-cola.

Figure 5A:
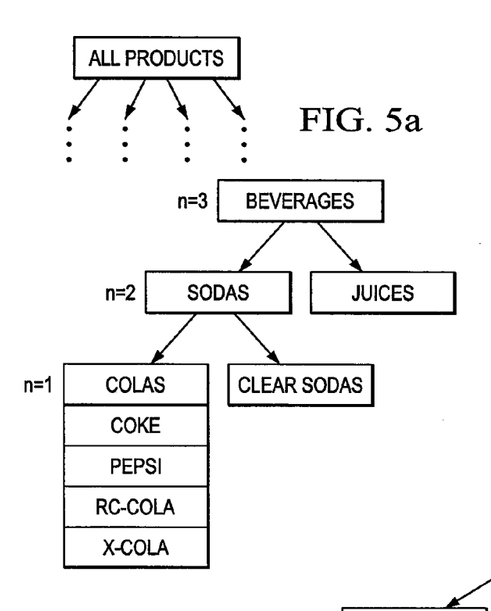
FIGS. 5a and 5b illustrate example hierarchical categorizations of products offered and stores operated by a retailer.

FIGS. 5*a* and 5*b* illustrate the product and store hierarchies for retailer 10. Because retailer 10 may sell tens of thousands of products, FIG. 5*a* only illustrates a subset of the entire product hierarchy. As shown on FIG. 5*a*, retailer 10 has placed X-cola into the 'colas' node of the hierarchy along with COKE®, PEPSI®, and RC-COLA® in step 130. X-cola shares many attributes with the other products in the 'cola' node and is largely substitutable with those products. Accordingly, the model parameters for the COKE®, PEPSI® and RC-COLA® products may also be quite similar to the parameters for X-cola. Moving upwards through the product hierarchy, the nodes become broader and more inclusive. Using the product hierarchy, the system can retrieve pre-existing model parameters from other, similar products to estimate model parameters for the new X-cola product. By moving upwards through the hierarchy, parameters are retrieved for increasingly large groupings of products having accurate model parameters based upon substantial quantities of T-LOG data.

In the present example, the system first calculates an average value of the individual weighted model parameters for products in the same hierarchical node as the new product in step 132. In this case, the system calculates the average of the individual weighted model parameters for each of the COKE®, PEPSI®, and RC-COLA® products. In other embodiments, however, any mathematical method of combining the parameters values for the 'cola' products may be used.

The system then moves to the next, more inclusive hierarchical node in step 134 and averages the individual weighted model parameters of all the products in the 'sodas' node. To prevent double counting, the parameter values for products in the 'colas' node are not included in the average. However, in alternative embodiments, the product parameters are included and counted twice. Because the 'sodas' node is more inclusive and contains products that do not share all of the attributes of X-cola, the system weights each of the average parameter values for the sodas, category to ensure that the dissimilar products in the 'soda' node do not have too much effect on the estimated model parameters for X-cola. Again, in other embodiments, other mathematical methods of combining the parameters values for the 'soda' products may be used.

The equation used to weight the average parameters at each hierarchical node should minimize the total contribution of the average parameter values as each node becomes more inclusive. Example algorithms apply a weighting of $1/\log(n)$, $1/\sqrt{n}$, or $1/n$ where n is the number of products occupying the hierarchical node or the number of parameter measurements included within each hierarchical node. Alternatively, n may be the level of the node within the hierarchical structure. Other weighting factors may include $1/n^a$, or $1/f(n)$, where a is a positive power and $f(n)$ is a monotonically increasing function of n. Similarly, the relative weighting may include applying a relative factor of $f(a)$ to the model parameters where f is a monotonically decreasing function of a, and a is an attribute of the hierarchical node such as the level of the node, the number of products occupying the node, or a difference measure of the products occupying the node. Further weighting algorithms use a combination of the level number of the node and the number of products or parameter measurements in each node to apply a weighting. The levels of each node are indicated in FIG. 5*a*.

Having determined the average parameter values for the 'sodas' grouping and determined a weighting for that average parameter value, the system moves to the 'beverages' node and repeats the process of step 134. First, the average of all individual weighted model parameters for the products fitting within the beverages, node are calculated. Note that the individual weighted model parameters for products in the 'sodas' node are removed to prevent double counting. After calculating the average of all the individual weighted parameters in the 'beverages' node, the average parameter values are weighted in accordance with the level of the 'beverages' node within the product hierarchy. In the case of the 'beverages' node, the level is 3.

Depending upon the application, the system may continue working upwards through the entire product hierarchy to calculate weighted average parameter values for all nodes in the product hierarchy. In the present example, however, the system iterates through three levels of the product hierarchy. In other embodiments, the system iterates through only two levels of the product hierarchy, or may even skip some levels within the hierarchy.

After calculating weighted average parameters for each of the relevant nodes in the hierarchy, the values are combined to determine final estimated parameter values for the X-cola product in step 136.

In one embodiment, the values for each parameters of the X-cola product model are calculated using equation (1):

$$\rho_n = \frac{\sum_{path}(\omega_{node} \cdot \rho_{node})}{\sum_{path}(\omega_{node})} \quad \text{Equation (1)}$$

In equation 1, $\rho_n$ is the estimated parameter, with n being the parameter number, $\omega_{node}$ is the relative weight for each node within the product hierarchy, and $\rho_{node}$ is the average of the individual weighted parameters of the same parameter number for each product fitting within the node. With specific reference to FIG. 5*a*, an example equation for calculating the estimated parameter values for X-cola may be:

$$\rho_n = \frac{\left(\begin{array}{c}\omega_{colas} \cdot \rho_{colas} + \omega_{sodas} \cdot \\ \rho_{sodas} + \omega_{beverages} \cdot \rho_{beverages}\end{array}\right)}{(\omega_{colas} + \omega_{sodas} + \omega_{beverages})} \quad \text{Equation (2)}$$

In equation (2), the weighting and average parameter values for nodes of FIG. 5*a* are calculated and combined together.

Using this method, model parameter values can be estimated for the new soda product X-cola based upon the individual weighted model parameters of other, similar products sold by retailer 10. By applying an appropriate weighting to each level within the product hierarchy, the system minimizes the effect of model parameters belonging to dissimilar products on the final parameter estimates. Accordingly, accurate model parameters can be generated for recently introduced products having only a minimal number of sales.

Having determined estimated parameter values based upon the sales of other similar products at store-A in Scottsdale, Ariz., the system may also look to other sales of similar products at other, similar stores of retailer 10 to further refine the parameter estimates for the X-cola product.

Figure 5B:
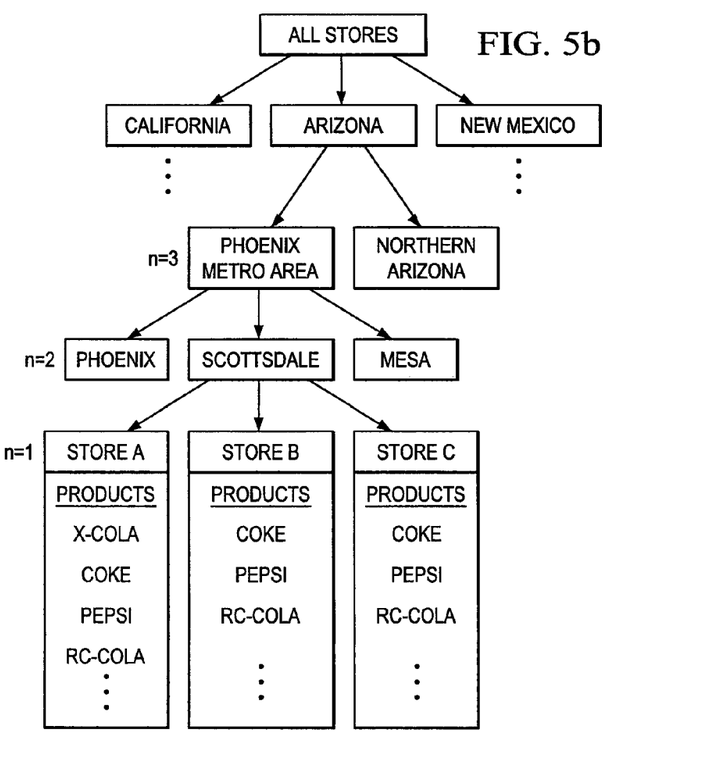

FIG. 5*b* illustrates the hierarchical structure of stores of retailer 10. Because all of the products sold by retailer 10 are sold at known stores, all of the products are placed into one of the store-specific nodes at the bottom of the hierarchy. As shown on FIGS. 5*a* and 5*b*, retailer 10 has started selling X-cola at store-A in Scottsdale, Ariz. Accordingly, X-cola, along with the other colas sold by retailer 10 at that store have been placed into the store-A node in the store hierarchy.

Having placed X-cola within the store hierarchy in step 130, the system iterates through a similar parameter estimation process as that used to estimate parameters using the product hierarchy.

The system first analyzes the product hierarchy to determine the node in the product hierarchy occupied by X-cola. After determining the product node—'colas'—the system retrieves a listing of other products occupying that node—in this case, the COKE®, PEPSI®, and RC-COLA® products.

With the list of similar products, the system moves to the store hierarchy and calculates an average value of the individual weighted model parameters for products in the 'colas' node at store-A in step 138. Accordingly, the system calculates the average of the individual weighted model parameters for each of the COKE®, PEPSI®, and RC-COLA® products at store-A. Depending upon the application, other mathematical methods of combining the parameter values may be used.

The system then moves to the next, more inclusive hierarchical node and averages the individual weighted model parameters of all the cola products in the 'Scottsdale' node in step 140. Accordingly, the system retrieves parameter values for COKE®, PEPSI®, and RC-COLA® products sold at all stores fitting with the 'Scottsdale' store node. To prevent double counting, the parameter values for cola products sold are store-A are not included in the average. Because the 'Scottsdale' store node is more inclusive and contains stores that do not share all of the attributes of store-A, the system weights the average parameter values for the 'Scottsdale' category to ensure that the parameters of the cola products at dissimilar stores do not have too much effect on the estimated model parameters for X-cola. Again, depending upon the application, other mathematical methods of combining the parameter values may be used.

The equation used to weight each hierarchical node should minimize the total contribution of the parameter values as each node becomes more inclusive. Example algorithms apply a weighting of 1/log(n), 1/sqrt(n), or 1/n where n is the number of products occupying the hierarchical node. Alternatively, n may be the level of the node within the hierarchical structure. Other algorithms may use a combination of the level number of the node and the number of products in each node to apply a weighting. The levels of each node are indicated in FIG. 5*b*. The weighting of nodes between product and store hierarchy structures may be different to reflect the differing degrees of similarity between products and/or stores on different levels of each hierarchy.

Having determined the average parameter values for the 'Scottsdale' store grouping and applied a weighting to that average parameter value, the system moves to the 'Phoenix Metro Area' node and repeats the process of step 140. First, the average of all individual weighted model parameters for the 'cola' products at stores fitting within the 'Phoenix Metro Area' node are calculated. The individual weighted model parameters for cola products sold at stores in the 'Scottsdale' node are removed to prevent double counting. After calculating the average of all the individual weighted parameters in the 'Phoenix Metro Area' node, the average parameter values are weighted in accordance with the level of the 'Phoenix Metro Area' node within the store hierarchy. In the case of the 'Phoenix Metro Area' node, the level is 3.

Depending upon the application, the system may continue working upwards through the entire store hierarchy to calculate weighted average parameter values for all nodes in the product hierarchy. In the present example, the system iterates through three levels of the store hierarchy. In other embodiments, the system iterates through only a single level of the store hierarchy, or may skip some levels of the hierarchy.

After calculating weighted average parameters for the relevant nodes in the hierarchy, the values are combined to determine final estimated parameter values for the X-cola product in step 142.

In one embodiment, the values for each parameters of the X-cola product model are calculated using equation (3):

$$\rho_n = \frac{\sum_{path}(\omega_{node} \cdot \rho_{node})}{\sum_{path}(\omega_{node})} \quad \text{Equation (3)}$$

In equation 3, $\rho_n$ is the estimated parameter, with n being the parameter number, $\omega_{node}$ is the relative weight for each node within the store hierarchy, and $\rho_{node}$ is the average of the individual weighted parameters of the same parameter number for each cola product fitting within the node. With specific reference to FIG. 5b, an example equation for calculating the estimated parameter values for X-cola may be:

$$\rho_n = \frac{\left(\begin{array}{c}\omega_{storeA} \cdot \rho_{storeA} + \omega_{scottsdale} \cdot \\ \rho_{scottsdale} + \omega_{phoenixmetro} \cdot \rho_{phoenixmetro}\end{array}\right)}{(\omega_{storeA} + \omega_{scottsdale} + \omega_{phoenixmetro})} \quad \text{Equation (4)}$$

In equation (4), the weighting and average parameter values for each node of FIG. 5b are calculated and combined together.

Having estimated parameter values for the model of X-cola sold at store-A in Scottsdale, Ariz. based upon both the sale of other products at store-A and the sale of other cola products at other stores, the system generates a final estimate of the parameter values for X-cola. The final estimate may be the average of both sets of parameters, however depending upon the application, other ways of combining the parameter values such as weighted averaging may be used.

Depending upon the requirements of retailer 10, the present system can be used to estimate model parameters in many different scenarios. For example, when introducing a new product at a particular store, as described above, the system may use the product hierarchy at the particular store to generate estimates, and may also use the store hierarchy to generate estimates based on the sales of similar products at other stores. If the product is introduced at a new store, but has been sold at other stores of retailer 10, the system may use only the store hierarchy to generate parameter estimates based upon sales of the product at other stores. Similarly, if retailer 10 opens a new store at a new location, the store hierarchy may be used to aggregate model parameters for each product sold at the other stores to generate initial model parameter estimates for each of the products sold at the new store.

The system may also be used to generate estimates of parameters relating to particular promotions offered for particular products. In each product model, the effect of a particular promotion may be reflected in one or more specific model parameters. Unfortunately, because promotions may only be run for a short period of time, there may only be a limited number of sales of a particular product while the promotion is in effect. In that case, the system may average the model parameters that describe promotional lift of a particular promotion across the entire product or store hierarchy.

In one example, retailer 10 wishes to predict how a two-for-one promotion will affect the sales of the new product, X-cola. In the model, parameters 3 and 4 of the model describe the promotional lift resulting from that particular promotion. Because X-cola is a new product, there is no T-LOG data for transactions that took place while the promotion was in effect. Similarly, because the promotion is offered infrequently, there is only a minimal number of T-LOG entries for soda products for transactions made while the promotion was in effect. Accordingly, there are no other similar products with which to estimate the parameter values for the promotion. In that case, the system may traverse the entire product hierarchy to generate weighted averages of only parameters 3 and 4 for all models for all products sold by retailer 10 at that store. Alternatively, the system may also traverse the entire store hierarchy across all products to generate averages of parameters 3 and 4 across all products and all stores. If a particular promotion is new across the entire enterprise, the estimated parameter values for the new promotion may be a weighted average of all promotions offered by the enterprise.

Figure 7:
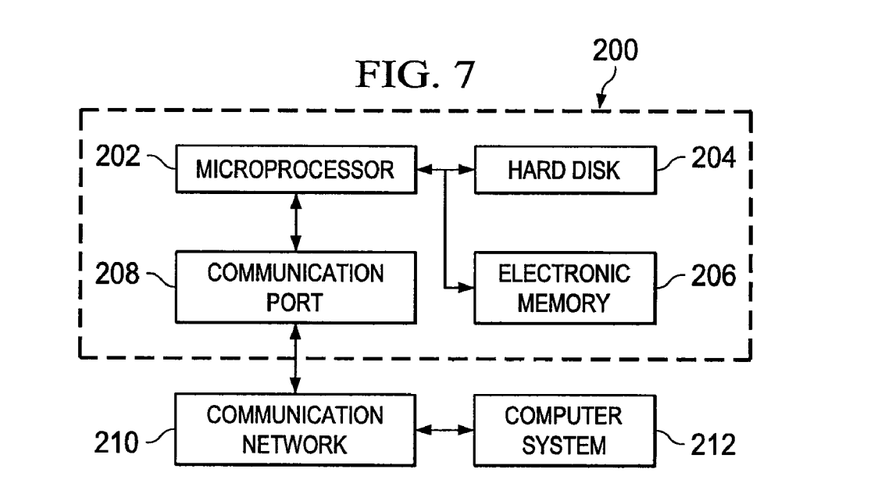
FIG. 7 is a computer system for generating estimated model parameters based upon hierarchical weighting of pre-existing model parameters.

Turning to FIG. 7, a general purpose computer 200 is provided for executing software instructions embodying the present system. General purpose computer 200 further includes communication systems that allow the computer to communicate via a network with other electronic devices such as other computers, barcode scanners, database storage systems, and the like.

General purpose computer 200 includes central processing unit or microprocessor 202, mass storage device or hard disk 204, electronic memory 206, and communication port 208. Computer 200 runs application software for estimating parameter values for new or recently introduced products. In alternative embodiments, computer 200 may also execute model 18.

Each product involved in a transaction includes a Universal Product Code (UPC) or barcode label. The barcode is encoded with a unique identification number for the product. The product is scanned over a barcode reader at the store checkout counter to read the UPC identification number. The barcode reader transfers the UPC data to computer 200. Computer 200 may be part of a communication network 210 which connects multiple computer systems 212 and barcode readers in many stores to computer system 200.

From the UPC data, a product database on hard disk 204 retrieves the price for the product and any associated data. As each product from customer 14's basket is scanned, computer 200 builds up a transaction entry in temporary file space on hard disk 204. Once the transaction is complete and customer 14 has paid, the transaction becomes a permanent record in the sales transaction log or database on hard disk 204, or as part of computer system 200.

Another product feature which can be used by retailer 10 to capture data is radio frequency identification tags (RFID). The RFID tag can be attached to products to track time dependent status such as date codes, inventory, and shelf stock. The RFID contains product information such as individual product identification, time, and location. The RFID information is transmitted to a receiving unit which interfaces with the store's computer system. Retailer 10 can track shelf life for perishable items and manage product rotation, ordering, inventory, and sales over time. If a quantity of perishable product is nearing its end of shelf life, then that product is a prime candidate for promotion to move the about-to-expire items. It is much more efficient for retailer 10 to discount the product rather than have to destroy the merchandise. Retailer 10 will also know when inventory is low due to the promotion and needs to be restocked or more products ordered. The location of the RFID tagged product can be monitored to see how display location within the store affects product sales. The time of the sale, e.g., day, month, year, is important in determining the distribution of the unit sales over time. The RFID information represents useful observable data.

Communication port 208 may connect by a high-speed Ethernet link to communication network 210. Communication network 210 may have dedicated communication links between multiple computers, or an open architecture system such as the World Wide Web, commonly known as the Internet. Retailer 10 can access computer 200 remotely through communication network 210.

In one embodiment, the hierarchical parameter estimation system is application software or a computer program residing on computer 200, computer system 212, or other network 210 accessible computer system. The software is originally provided on computer readable media, such as compact disks (CDs), or downloaded from a vendor website, and installed on the desired computer. In one case, the system can be executed directly on computer 200, which may be located in the facilities of retailer 10. Retailer 10 interacts with computer 200 through a user control panel, which may take the form of a local computer terminal, to run the system. Alternatively, retailer 10 uses computer system 212 to access the system remotely, e.g., through a website contained on hard disk 204. Retailer 10 can make requests of a third party who in turn runs the system and generates reports on behalf of retailer 10. The remote requests to execute the system may be made to the third party through the website or other communication medium.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of estimating demand model parameters, comprising:
   storing transaction data from customer sales in a database, the transaction data including a product and a store, the database including a hierarchical categorization of the products and the stores;
   generating, by the computer, a demand model for each product at each store in the database, the demand models including model parameters;
   aggregating, by the computer, first and second sets of model parameters from a first set of products occupying a first node of the hierarchical categorization and a second set of products occupying a second node of the hierarchical categorization;
   weighting, by the computer, the first and second sets of model parameters, the weighting of the first and second sets of model parameters includes applying a relative factor based on a first level of the first set of products within the hierarchical categorization and a second level of the second set of products within the hierarchical categorization; and
   storing the average of the weighted first and second sets of model parameters in the database as the model parameters for a demand model of a new product.

2. The computer-implemented method of claim 1, wherein weighting the second set of model parameters includes applying a relative factor of f(a) to the second set of model parameters, where f is a monotonically decreasing function of a, and a is an attribute of the second node of the hierarchical categorization.

3. The computer-implemented method of claim 1, wherein the transaction data includes promotion data.

4. The computer-implemented method of claim 3, wherein the model parameters include a parameter describing a promotional lift value for each product.

5. The computer-implemented method of claim 4, including aggregating a third set of model parameters from a third set of products occupying all nodes of the hierarchical categorization, the third set of model parameters describing the promotional lift of a product.

6. The computer-implemented method of claim 1, including weighting the model parameters of each product in each hierarchical node.

7. The computer-implemented method of claim 6, wherein the model parameters for each product are weighted based upon a statistical variance of the model parameters for each product or a quality of model fit metric.

8. A computer-implemented method of estimating model parameters, comprising:
   storing transaction data from customer sales in a database, the transaction data including a product and a store;
   generating, by the computer, a model for each product, the models including model parameters;
   aggregating, by the computer, first and second sets of model parameters from a first set of products occupying a first node of a hierarchical categorization and a second set of products occupying a second node of the hierarchical categorization;
   weighting, by the computer, the first and second sets of model parameters, the weighting of the first and second sets of model parameters includes applying a relative factor based on a first level of the first set of products within the hierarchical categorization and a second level of the second set of products within the hierarchical categorization; and
   storing a combination of the first and second sets of model parameters in the database.

9. The computer-implemented method of claim 8, wherein weighting the second set of model parameters includes applying a relative factor of f(a) to the second set of model parameters, where f is a monotonically decreasing function of a, and a is an attribute of the second node of the hierarchical categorization.

10. The computer-implemented method of claim 8, wherein the transaction data includes promotion data.

11. The computer-implemented method of claim 10, wherein the model parameters include a parameter describing a promotional lift value for each product.

12. The computer-implemented method of claim 11, including aggregating a third set of model parameters from a third set of products occupying all nodes of the hierarchical categorization, the third set of model parameters describing the promotional lift of a product.

13. The computer-implemented method of claim 8, including weighting the model parameters of each product in each hierarchical node.

14. The computer-implemented method of claim 13, wherein the model parameters for each product are weighted based upon a statistical variance of the model parameters for each product or a quality of model fit metric.

15. A computer program product usable with a programmable computer processor having a computer readable program code embodied therein, comprising:
- computer readable program code that stores transaction data from customer sales in a database, the transaction data including a product and a store;
- computer readable program code that generates a model for each product, the models including model parameters;
- computer readable program code that aggregates first and second sets of model parameters from a first set of products occupying a first node of a hierarchical categorization and a second set of products occupying a second node of the hierarchical categorization;
- computer readable program code that weights the first and second sets of model parameters, the weighting of the first and second sets of model parameters includes computer readable program code which applies a relative factor based on a first level of the first set of products within the hierarchical categorization and a second level of the second set of products within the hierarchical categorization; and
- computer readable program code which stores a combination of the first and second sets of model parameters in the database.

16. The computer program product of claim 15, wherein the computer readable program code which weights the second set of model parameters includes computer readable program code which applies a relative factor of f(a) to the second set of model parameters, where f is a monotonically decreasing function of a, and a is an attribute of the second node of the hierarchical categorization.

17. A computer system for manipulating data, comprising:
- means for storing transaction data from customer sales in a database, the transaction data including a product and a store;
- means for generating a model for each product, the models including model parameters;
- means for aggregating first and second sets of model parameters from a first set of products occupying a first node of a hierarchical categorization and a second set of products occupying a second node of the hierarchical categorization;
- means for weighting the first and second sets of model parameters, the weighting of the first and second sets of model parameters includes applying a relative factor based on a first level of the first set of products within the hierarchical categorization and a second level of the second set of products within the hierarchical categorization; and
- means for storing a combination of the first and second sets of model parameters in the database.

18. The computer system of claim 17, wherein the transaction data includes promotion data.

19. The computer system of claim 18, wherein the model parameters include a parameter describing a promotional lift value for each product.

20. The computer system of claim 19, including means for aggregating a third set of model parameters from a third set of products occupying all nodes of the hierarchical categorization, the third set of model parameters describing the promotional lift of a product.

* * * * *